United States Patent [19]

Storay et al.

[11] Patent Number: 5,118,124
[45] Date of Patent: Jun. 2, 1992

[54] HAND TROLLEY

[76] Inventors: Craig F. Storay, Bellamy Hills, Forthside, Tasmania 7310; John A. Baldini, Buster Road, Melrose, Tasmania 7310, both of Australia

[21] Appl. No.: 582,771

[22] Filed: Sep. 13, 1990

Related U.S. Application Data

[63] Continuation of Ser. No. 294,564, Dec. 12, 1988, abandoned.

[30] Foreign Application Priority Data

Apr. 13, 1987 [AU] Australia .................. P11419

[51] Int. Cl.⁵ .................................. B62B 1/04
[52] U.S. Cl. ................... 280/47.21; 280/47.27
[58] Field of Search .......... 280/47.21, 47.27, 47.29

[56] References Cited

U.S. PATENT DOCUMENTS

| | | | |
|---|---|---|---|
| 356,473 | 1/1887 | James | 280/47.27 |
| 2,607,606 | 8/1952 | Millen | 280/56 |
| 2,650,834 | 9/1953 | Coval | 280/47.2 |
| 2,700,573 | 1/1955 | Nordgard | 298/5 |
| 2,856,195 | 10/1958 | Ziebarth | 280/47.27 |
| 3,642,301 | 2/1972 | Crawford | 280/47.12 |
| 3,844,431 | 10/1974 | Crawford | 214/511 |
| 4,653,765 | 3/1987 | Smalley et al. | 280/47.27 |
| 4,681,330 | 7/1987 | Misawa | 280/47.27 |

FOREIGN PATENT DOCUMENTS

| | | | |
|---|---|---|---|
| 243221 | 2/1963 | Australia | 280/47.29 |
| 1890967 | 9/1969 | Australia . | |
| 4257768 | 5/1970 | Australia . | |
| 3506394 | 9/1986 | Fed. Rep. of Germany . | |
| 1301944 | 7/1962 | France | 280/47.27 |
| 380543 | 9/1964 | Switzerland | 280/47.27 |
| 566932 | 1/1945 | United Kingdom . | |

*Primary Examiner*—Andres Kashnikow
*Assistant Examiner*—Eric Culbreth
*Attorney, Agent, or Firm*—Michael, Best & Friedrich

[57] ABSTRACT

A hand trolley for lifting and moving an object comprises a support frame for the object and a wheel assembly coupled to the support frame by means of a link arm 33 on each side of the trolley. Each link arm is connected at one end to the axle 31 of the wheel assembly and pivotally connected at the other end to the support frame. In a carry position of the trolley, at which the object is supported on the wheel assembly, the link arms 33 are located in a locked position so as to lock together the wheel assembly and the support frame when an operator pulls the trolley rearwardly over an obstacle.

5 Claims, 2 Drawing Sheets

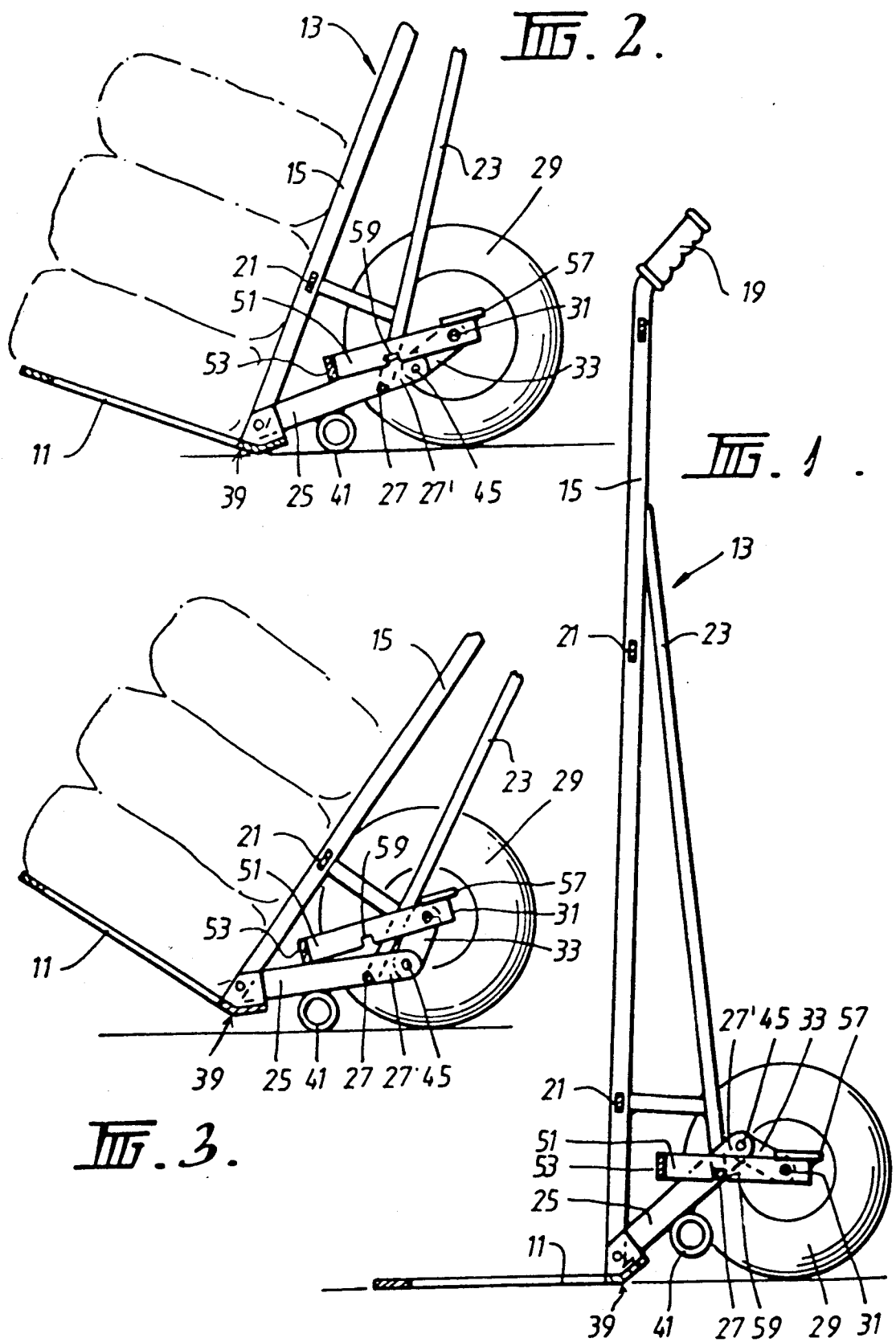

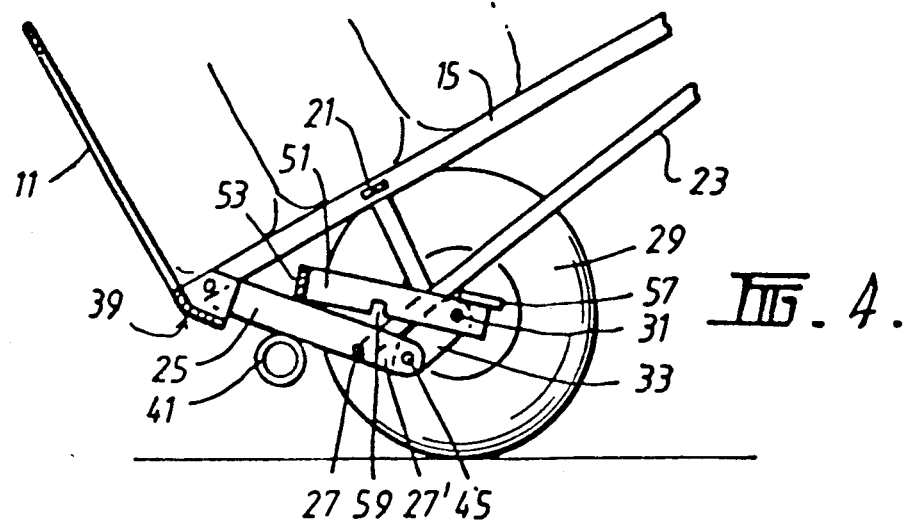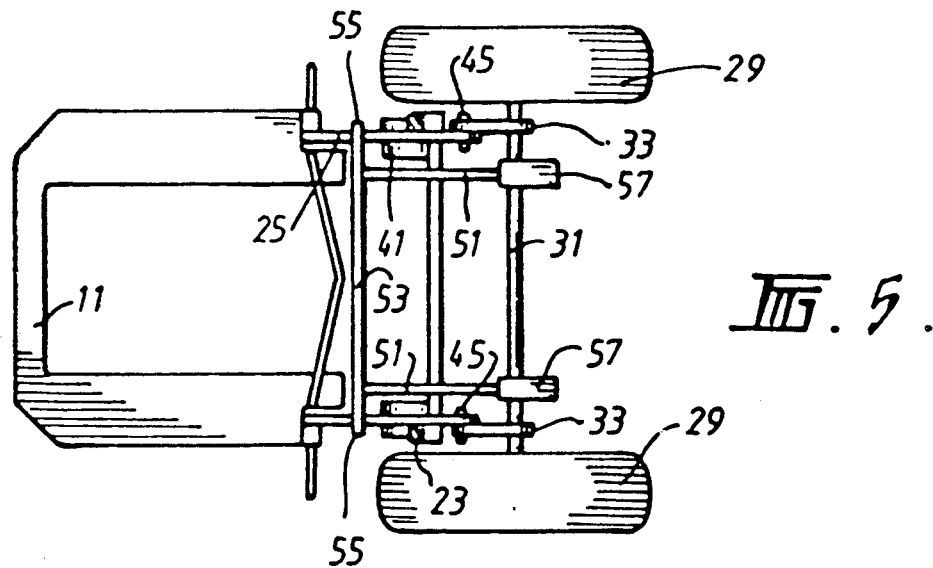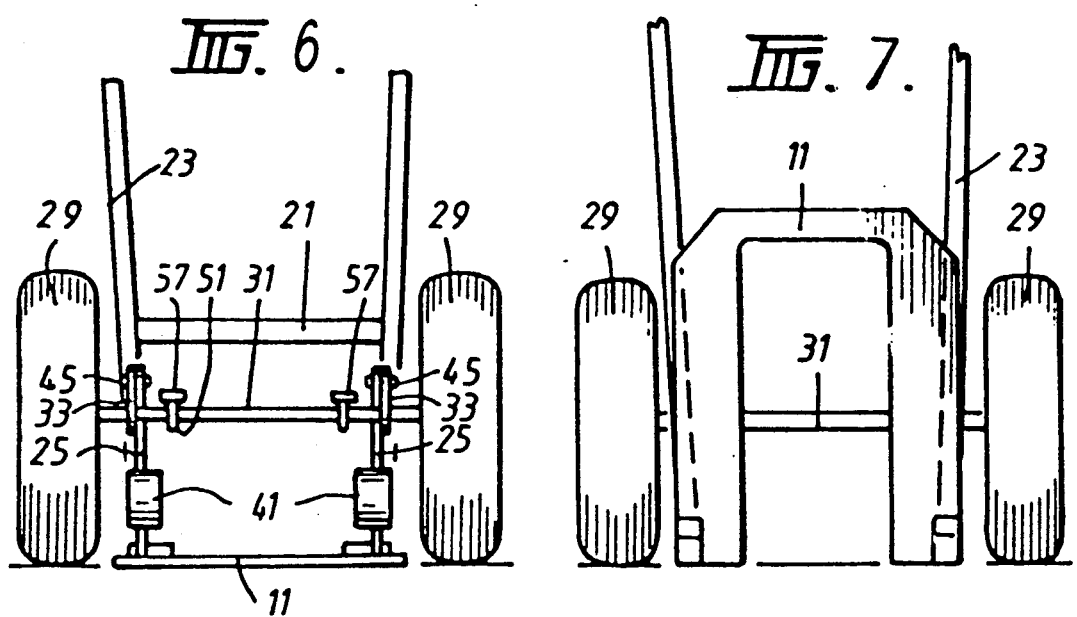

HAND TROLLEY

This application is a continuation of application Ser. No. 07/294,564, filed Dec. 12, 1988 now abandoned.

This invention relates to hand trolleys for lifting and moving objects.

Conventional hand trolleys comprise a frame to support an object to be moved, the frame having a forwardly directed base plate and an upwardly extending section, and a wheel assembly comprising two spaced apart wheels supported for rotation about an axle. In use, conventional hand trolleys are manipulated by a user so that the base plate is positioned underneath the object to be lifted and moved, the user then tilts the support frame rearwardly to lift the support frame and the object carried thereon from the ground so that the load is supported from the ground solely by the wheel assembly, and in this position, the user is able to wheel the trolley to the required location.

Usually, in conventional hand trolleys, the wheel assembly is fixed relative to the support frame so that as the support frame is tilted rearwardly the support frame pivots about the axle of the wheel assembly. The disadvantage with this arrangement is that when heavy and/or bulky objects are to be carried on the trolley it is often difficult to tilt the support frame from an upright rest position to a carry position.

In order to alleviate this disadvantage it is also known to construct hand trolleys so that the wheel assembly and the support frame are coupled together by link arms, one on each side of the trolley, which are connected to the wheel assembly and pivotally connected to the support frame. With such an arrangement, as the hand trolley is tilted rearwardly, the support frame pivots initially about the rear edge of the base plate and the wheel assembly moves simultaneously rearwardly relative to the base plate until the support frame contacts the axle of the wheel assembly, at which point further rearward tilting movement results in the pivot point transferring from the rearward edge of the base plate to the axle. Such relative rearward movement of the wheel assembly has been found to significantly reduce the effort required to transfer the hand trolley from an upright rest position to a carry position.

One disadvantage with the hand trolleys described in the preceding paragraph is that the hand trolleys lack stability when moved rearwardly over obstacles such as upwardly inclined steps. Specifically, it has been found that with such rearward movement, the wheels of the wheel assembly remain against an upright wall of the obstacle and the support frame and the object carried thereon pivot upwardly and rearwardly relative to the axle until the limit of the pivoting movement is reached, at which point the wheel assembly is drawn over the obstacle. However, once the obstacle has been traversed the support frame returns to the normal operating position, and such return generally is accompanied by a hazardous forward jerking movement of the support frame and the object carried thereon. It is known to provide such trolleys with hand operated locking devices. However, such arrangements require frequent operation by the user and are generally inconvenient.

It is an object of the present invention to alleviate the disadvantage described in the preceding paragraph.

According to the present invention there is provided a hand trolley for lifting and moving an object on the ground or a floor surface, comprising:

(a) a frame to support the object, the support frame having a forwardly directed base section and a rearward section extending upwardly from the base section;

(b) a wheel assembly comprising a pair of spaced apart wheels rotatably supported by an axle; and (c) two link assemblies, one on each side of the trolley, to couple together the support frame and the wheel assembly so that, in use, the link assemblies permit the support frame to pivot about the rearward region of the base section and permit the wheel assembly simultaneously to move rearwardly relative to the base section as the support frame is tilted rearwardly from a rest position, at which the base section substantially contacts the ground and the rearward section is generally upright, to a carry position, at which the support frame is clear of the ground and supported on the wheel assembly.

A preferred embodiment of the invention is now described with reference to the accompanying drawings, in which:

FIG. 1 is a side cross-sectional view showing the trolley in a rest position with the axle locked to the frame, and showing the angular relationship of the frame, base plate and link assemblies;

FIG. 2 is a side cross-sectional view showing the trolley tilted rearwardly relative to the wheels and the rockers in contact with the ground surface and showing the angular relationship of the frame, base plate and link assemblies;

FIG. 3 is a side cross-sectional view showing the trolley tilted rearwardly relative to the wheels with the link assemblies in the stop position against the frame and the rockers in contact with the ground and showing the angular relationship of the frame and the link assemblies;

FIG. 4 is a side cross-sectional view showing the trolley tilted rearwardly relative to the wheels in the normal wheeling position and showing the rockers raised above the ground and the angular relationship of the frame and the link assemblies;

FIG. 5 is a plan view showing the lower portion of the trolley;

FIG. 6 is a rearward elevational view of the lower portion of the trolley; and

FIG. 7 is a front elevational view of the lower portion of the trolley.

The hand trolley shown in the figures comprises a frame to support an object, a wheel assembly to support the frame and the object carried thereon, and two spaced apart link assemblies, one on each side of the trolley, to couple together the support frame and the wheel assembly.

The support frame comprises a forwardly directed base plate 11 which, in use, is positioned under the object to be carried, and a generally upwardly extending rearward section 13. The base plate 11 is pivotally connected at the intersection with the rearward section 13 so that the base plate 11 can be swung to rest against the rearward section 13. In this position the trolley can readily be stored in a confined space or transported unrestrained, for example on the tray of a truck.

The rearward section 13 comprises two parallel elongate members 15, one on each side of the trolley, which terminate in hand grips 19 and are interconnected by a cross-member 21.

The rearward section 13 further comprises a structural support assembly. The structural support assembly comprises a strut 23 which extends downwardly and rearwardly from an upper section of each elongate member 15 and a tie-member 25 which extends upwardly and rearwardly from a lower section of each elongate member 15 and is connected at its upper end to the strut 23. The structural support assembly further comprises a bar 27 (FIG. 4) which interconnects the strut/tie-members on each side of the trolley. The tie-members 25 each include an extension 27.

The wheel assembly comprises a pair of spaced apart wheels 29 supported for rotation on an axle 31.

Each link assembly comprises a link arm 33 which is connected at one end to the axle 31 and pivotally connected at the other end to the extension 27 of the tie-members 25.

The hand trolley further comprises a rocker 41 connected to each tie-member 25. The rockers 41 define intermediate pivot surfaces.

The hand trolley further comprises a locking assembly to lock together the support frame and the wheel assembly in the rest position shown in FIG. 1. The locking assembly comprises a pair of side arms 51, one on each side of the trolley, pivotally connected to the axle 31. The side arms are interconnected by a cross-member 53 (FIG. 5). The cross-member 53 has extensions 55 which rest on the tie-members 25 when the trolley is rearwardly tilted. Each side arm 51 includes a toe-plate 57 at the end adjacent the axle 31. In addition, approximately mid-way along the length of each side arm 51, there is a downwardly directed notch 59 which is arranged to receive the bar 27 which interconnects the strut/tie-members on each side of the trolley. The engagement of the bar 27 in the notches 59 effectively locks together the support frame and the wheel assembly, such as shown in FIG. 1.

In use, the trolley is released from the rest position shown in FIG. 1 by depressing one of the toe-plates 57 to pivot the locking assembly upwardly around the axle 31 and to release the notches 59 from the bar 27. An operator can then tilt the support frame rearwardly to the carry position shown in FIG. 4. As the support frame is tilted rearwardly the support frame pivots initially on the rearward edge 39 of the base plate 11 until the rockers 41 contact the ground or the floor surface. At this point, with further rearward tilting movement the support frame pivots on the intermediate pivot surfaces defined by the rockers 41. As is shown in FIG. 3, such rearward tilting movement continues until the struts 23 contact the link arms 33. Further tilting movement lifts the rockers 41 from the ground or floor surface thereby to complete transfer of the load onto the wheel assembly in the carry position shown in FIG. 4.

It will be noted that during the above described rearward pivoting movement the link arms 33 pivot downwardly so that the pivot points 45 of the extensions 27' and the link arms 33 move in an arc around the axle 31.

It will also be noted that when each link arm 33 is in the position shown in FIGS. 3 and 4 an imaginary line extending from the pivot point 45 along the centre-line of the link arm 33 will intersect an imaginary line extending upwardly from the elongate member 15. The imaginary line from the elongate member, in use, is coincident with the direction of a lifting force applied by an operator to pull the trolley rearwardly upwardly and over an obstacle, such as a step. When each link arm 33 is in the position shown in FIGS. 3 and 4 the lifting force is directed solely through the link arm 33 (and the link arm 33 on the other side of the trolley) and as a consequence the wheel assembly and the support frame are effectively locked and move together over the obstacle.

It has also been found that such effective locking can be achieved if the imaginary line from each link arm 33 is generally coincident with the imaginary line from the elongate member 15. In this regard, the term "generally coincident" is understood herein to mean that the imaginary line from each link arm 33 may diverge by up to 20° from the imaginary line extending upwardly from the elongate member 15.

In the carry position shown in FIG. 4, the trolley can be wheeled to the required location, at which point the trolley can be lowered to the rest position shown in FIG. 1. On return to the rest position shown in FIG. 1 the notches 59 in the side arms 51 again receive the bar 27 thereby to lock together the wheel assembly and the support frame, the wheels always remaining in contact with the ground or floor surface.

Many modifications may be made to the preferred embodiment without departing from the spirit and scope of the invention.

We claim:

1. A hand trolley for lifting and moving an object on the ground or a floor surface, comprising, a frame to support the object, the support frame having a forwardly directly base section and a rearward section extending upwardly from the base section, the rearward section comprising two elongate members, one on each side of the trolley, two attached handles to be gripped by the operator, and two tie members, one on each side of the trolley, extending rearwardly from a lower section of the elongate members, a wheel assembly comprising a pair of spaced apart wheels rotatably supported by an axle, two spaced apart rockers connected to the support frame to define intermediate pivot surfaces, and two link assemblies, one on each side of the trolley, to couple together the support frame and the wheel assembly so that in use the support frame pivots initially about the rearward edge of the base section and then about the intermediate pivot surfaces and finally about the axle as the support frame is tilted rearwardly from an upright position, at which the base section substantially contacts the ground and the rearward section is generally upright, to a wheeling position, at which the support frame is clear of the ground and supported on the wheel assembly, each link assembly comprising a link arm pivotally connected at one end to one of the tie members at a pivot point positioned above the level of the axle when the trolley is in the upright position and connected at the other end to the axle, whereby as the support frame is tilted rearwardly from the upright position the pivot points move downwardly in an arc from the position above the level of the axle, the support frame further comprising two stops, one on each side of the trolley, which, during rearward tilting movement of the support frame from the upright position, move relative to the link arms to contact the link arms and thereby prevent further downward pivoting movement of the pivot points when the pivot points are in a position below the level of the axle and an imaginary line drawn in a direction from each pivot point along the link arms and through the centre of the axle intersects an imaginary line drawn along each elongate member from the lower end which line represents the direction of force applied to pull the trolley rearwards, so that in use when the trolley is further tilted from this position to the wheeling position and is pulled upwardly and rearwardly over an obstacle the resistance to the pulling force provided by the obstacle keeps the link arms firmly against the stops so that the support frame and the wheel assembly move together over the obstacle.

2. The hand trolley defined in claim 1 wherein each said rocker is connected to one of said tie-members.

3. A hand trolley for lifting and moving an object on the ground or a floor surface, comprising:
  (a) a frame to support the object, the support frame having a forwardly directed base section and a rearward section extending upwardly from the base section, the rearward section of the support frame comprising two elongate members, one on each side of the trolley, which terminate in handles to be gripped by the operator, a cross-member interconnecting the elongate members, a structural support assembly for each elongate member, each structural support assembly comprising a strut extending downwardly and rearwardly from an upper section of the elongate member and a tie-member extending upwardly and rearwardly from a lower section of the elongate member and connected to a lower end of the strut, each tie-member having an extension, and the support frame further comprising a reinforcing bar interconnecting the structural support assembly of each elongate member;
  (b) a wheel assembly comprising a pair of spaced apart wheels rotatably supported by an axle; and
  (c) link assembly means for coupling together the support frame and the wheel assembly and for causing the support frame to pivot initially about the rearward edge of the base section and then finally about the axle as the support frame is tilted rearwardly from a rest position, at which the base section substantially contacts the ground and the rearward section is generally upright, to a carry position, at which the support frame is clear of the ground and supported on the wheel assembly, the link assembly means comprising two link arms, one on each side of the trolley, each link arm being pivotally connected at one end to the extension of one of the tie-members and being rotatable relative to the extension between a first position associated with the support frame being in the rest position and a second position associated with the support frame being in the carry position and connected at the other end to the axle; and
  (d) self-effectuating means for retaining the link arms in the second position when a force is applied to at least one of the elongate members to pull the trolley upwardly and rearwardly over an obstacle and for causing the link arms to return to the first position when the support frame is returned to the rest position.

4. The hand trolley defined in claim 3, further comprises a rocker connected to the support frame, and wherein the rocker defines an intermediate pivot surface so that in use as the support frame is tilted rearwardly from the rest position to the carry position the support frame pivots first on the rearward edge of the base section and second on the intermediate pivot surface.

5. The hand trolley defined in claim 4, wherein said rocker is connected to each said tie-member.

* * * * *